Figure 1:
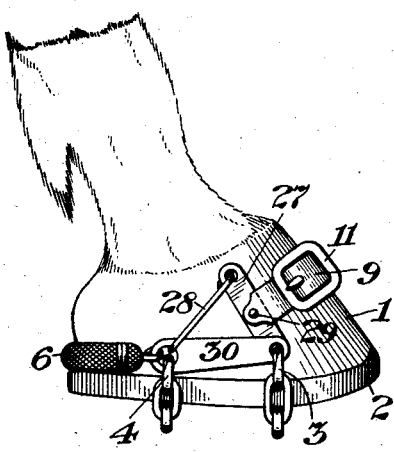

G. N. KINNELL.
OVERSHOE.
APPLICATION FILED JAN. 3, 1910. RENEWED OCT. 31, 1911.

1,010,387.  
Patented Nov. 28, 1911.

WITNESSES:  
INVENTOR  
George N. Kinnell  
BY  
George O. Adam ATTORNEY

UNITED STATES PATENT OFFICE.

GEORGE N. KINNELL, OF PITTSFIELD, MASSACHUSETTS.

OVERSHOE.

1,010,387. Specification of Letters Patent. Patented Nov. 28, 1911.

Original application filed March 6, 1909, Serial No. 481,830. Divided and this application filed January 3, 1910, Serial No. 536,056. Renewed October 31, 1911. Serial No. 657,722.

*To all whom it may concern:*

Be it known that I, GEORGE N. KINNELL, a citizen of the United States, and a resident of Pittsfield, in the county of Berkshire and State of Massachusetts, have invented certain new and useful Improvements in Overshoes, of which the following is a specification.

My present invention concerns detachable overshoes for various purposes, particularly applicable for use on horses and other hoofed animals for various purposes and particularly to prevent slipping.

My present application is a division of my application Serial No. 481,830 filed March 6, 1909.

In my prior application Serial No. 460,336, I have shown an overshoe consisting of interconnected diagonal strands or articulations adapted to serve as calks and suspended by a spreader and equalizing lever on each side of the foot, subject to upward and forward tension through a toe strap and to rearward tension through a heel member seated in the notches under the heels of the hoof and above the rearwardly projecting ends of the metallic shoe. The heel member may be of fine quality steel wire or chain, but I prefer heavy baling wire which does not stretch and is not very resilient, yet is flexible enough so that in use it fits itself to the surface upon which it bears and becomes bent or set so that there is practically no tendency for it to spring out of position. Various other novel features and functions of said overshoe are explained in said application. In other applications, I have described auxiliary means for supporting the heel member independently of engagement with the heels of the hoof. For present purposes, I have chosen to show the heel member as consisting of cushioned wire engaging the notches between the ordinary shoe and the heels of the hoof, after the manner set forth in said application Serial No. 460,336; also, the tread members are shown as consisting of strands or articulations in the form of short lengths of chain. These may be disposed across the cavity under the hoof in any desired way, though for most purposes I prefer the diagonal arrangement with an interconnecting central link, such as shown in the aforesaid application. In all of the figures, the securing means on the overshoe includes a tension member extending diagonally over the toe of the hoof and adapted to oppose downward and rearward displacement, after the manner explained in said application.

The various features constituting my present invention will be evident from the following detailed description in connection with the accompanying drawings, in which—

Figure 2:
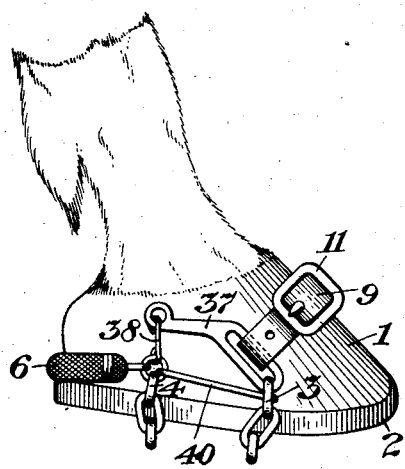
Figure 3:
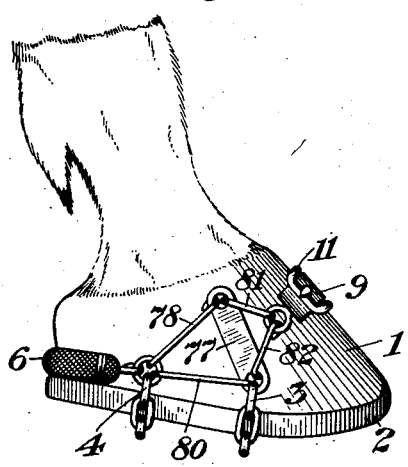

Figures 1 to 3 are side elevations each showing a horse's hoof with an overshoe embodying various features of my invention.

In all of the figures, the hoof 1 is provided with the metal shoe 2 of the ordinary type projecting slightly beyond the heels of the hoof. In all of the figures, the tread strands are connected to the securing means by end links, 3, 4, and in each case the securing means comprises a band encircling the walls of the hoof, comprising a heel member 6 and a toe member or strap 9, adapted to be tightened in place by buckle 11, together with intermediate connection between the toe and heel members.

In the figures, forms of securing means are shown wherein the functions of spreader and equalizing lever are separated, the portion of the pull of the equalizing lever applied to the rear tread member being applied at a point higher up on the hoof than is the case where the functions of spreader and equalizing lever are combined in one member as shown in my application 481,830. The end links 3, 4, of the tread chains are split links, thereby facilitating removal and renewing of the tread chains when these may become worn or broken in use.

In Fig. 1, the equalizing lever 27 is pivoted at the link of the forward chain 3, and extends up the surface of the hoof along the approximately straight line elements thereof. The free upper end of the lever exerts tension on the rear link 4 at a high angle upward through the intermediate tension member 28. The pull of the toe strap is applied through a pivotal connection 29 intermediate the points of connection of 3 and 28, the upward resultant of the tension of the strap being thereby applied to both the forward and the rear tread strands. In this case, a spreader to maintain separation of the forward and rear tread chains is not absolutely necessary as the forward component of the pull of the equalizing lever on 3 tends to keep the forward tread chains in a forward position and the heel member 6 tends to keep the rear tread member in the rearward position. As shown, however, the spreader 30 is provided, which is preferably sufficiently rigid to form a thrust member adapted to maintain separation of the tread strands against either thrust or tension.

Fig. 2 is a modified embodiment of a principle illustrated in Fig. 1. The equalizing lever 37 is provided with a loop for sliding, adjusting engagement with the toe strap above the point of interlinkage with the forward chain 3. The free end of the lever 37 is extended to a point above the rear tread link 4 and applies upward stress thereto through an intermediate member 38. In this case, a tension connection 40 is provided between links 3 and 4 to serve as a tension spreader to limit the distance of separation under pull of the toe strap.

In Fig. 3, I have combined and modified certain features shown in Figs. 1 and 2. In this case, the equalizing lever 77 extends in approximately the same general direction as the lever 27, in Fig. 1. It is connected to the rear tread link 4 by a tension member 78, similar to 28. The spreader is a tension spreader 80, adapted to limit the possible distance of separation of the forward and rear tread links. The toe strap is connected to the equalizing lever by tension members 81, 82, instead of by a pivot, as in Fig. 1, or a loop, as in Fig. 2.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. In a device of the class described, flexible tread connections, and securing means comprising a diagonally arranged toe member, a rearwardly extending heel member, and an equalizing lever secured to the forward tread connection at one end and at the other end, to a tension member extending to the rear tread connection, and to the toe strap by means adapted to cause the tension of the latter to take effect on said equalizing lever as if applied at a point intermediate its ends.

2. In a device of the class described, flexible tread connections, and securing means comprising a diagonally arranged toe member, a rearwardly extending heel member, and an equalizing lever secured to the forward tread connection at one end and at the other end, to a tension member extending to the rear tread connection, and to the toe strap by means adapted to cause the tension of the latter to take effect on said tread connections adjacent the lower margin of the hoof.

3. In a device of the class described, flexible tread connections, and securing means comprising a diagonally arranged toe member, a rearwardly extending heel member, and an equalizing lever secured to the forward tread connection at one end and at the other end, to a tension member extending to the rear tread connection, and to the toe strap by means adapted to cause the tension of the latter to take effect on said equalizing lever as if applied at a point intermediate its ends, and a rigid spreader directly connected between said tread connections adjacent the lower margin of the hoof.

4. In a device of the class described, flexible tread connections and securing means comprising a diagonally arranged toe member, a rearwardly extending heel member and a straight equalizing lever secured to the forward tread connection at one end and at the other end to a tension member extending to the rear tread connection and connected to the toe strap so that the tension of the latter is applied to said equalizing lever at a point intermediate its ends.

5. In a device of the class described, a flexible tread and flexible connections therefor, in combination with securing means comprising tension members extending over the toe and across the heels of the hoof, together with a rigid equalizing lever for affording upward tension on a plurality of said tread connections and a separate spreader interposed between said tread connections.

6. In a device of the class described, a flexible tread and flexible connections therefor, in combination with securing means comprising tension members extending over the toe and across the heels of the hoof, together with a rigid equalizing lever for affording upward tension on a plurality of said tread connections and a separate spreader consisting of a rigid thrust member interposed between said tread connections.

7. An overshoe comprising a flexible tread, securing means comprising a toe member, a heel member and interposed parts, one constituting an equalizer and the other a spreader for the tread elements.

Signed at New York, in the county of New York and State of New York this twenty third day of December A. D. 1909.

GEORGE N. KINNELL.

Witnesses:
GEORGE C. DEAN,
IRVING M. OBRIEGHT.

Copies of this patent may be obtained for five cents each, by addressing the "Commissioner of Patents, Washington, D. C."